Sept. 22, 1925.
H. J. GOFF
MEANS FOR MAKING A LAMINATED WOOD PRODUCT
Filed July 7, 1924
1,554,497
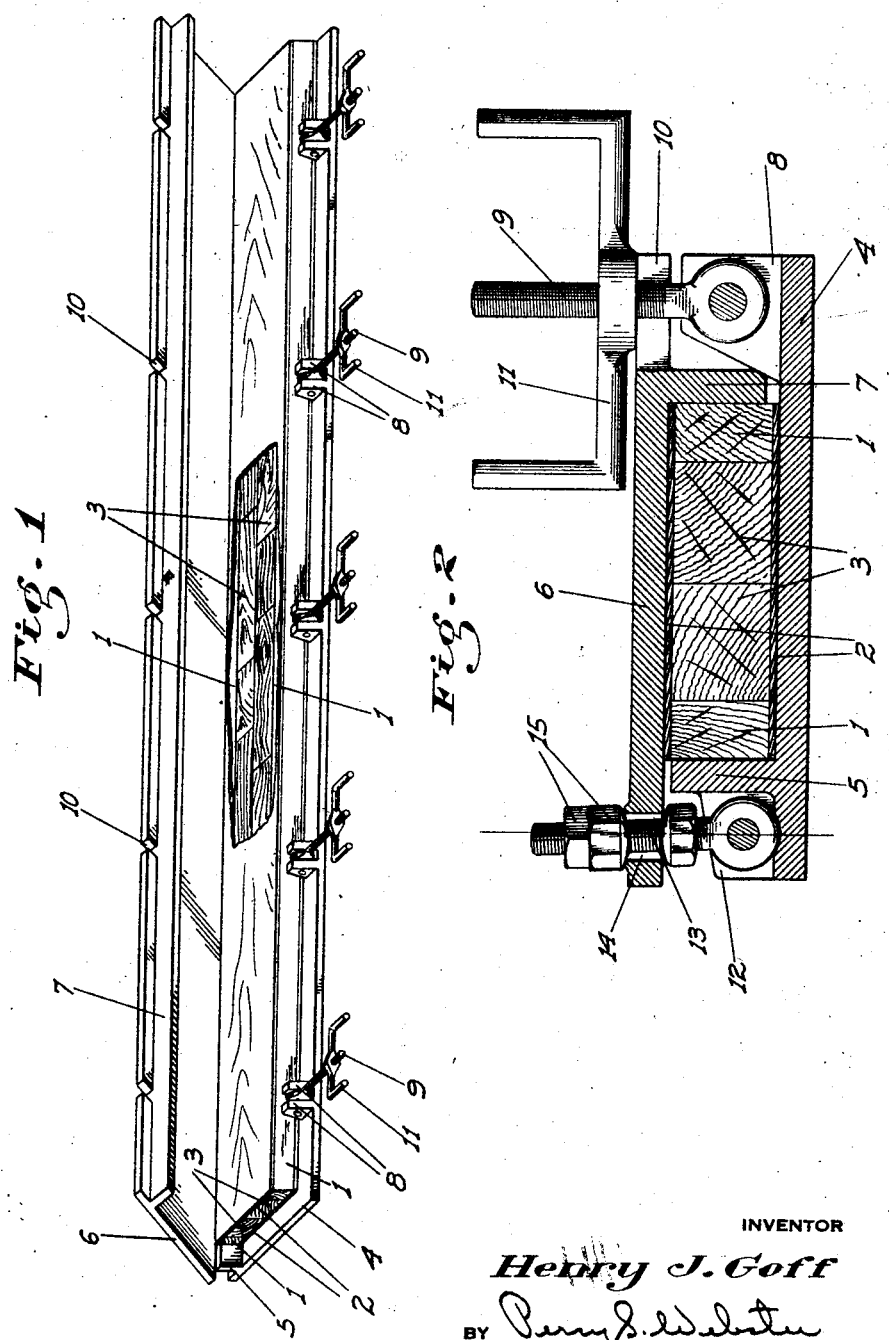
INVENTOR
Henry J. Goff
BY
ATTORNEY Patented Sept. 22, 1925.

1,554,497

UNITED STATES PATENT OFFICE.

HENRY J. GOFF, OF SUSANVILLE, CALIFORNIA, ASSIGNOR OF ONE-THIRD TO C. A. WEBSTER AND ONE-THIRD TO H. V. TARTER, BOTH OF STOCKTON, CALIFORNIA.

MEANS FOR MAKING A LAMINATED WOOD PRODUCT.

Application filed July 7, 1924. Serial No. 724,685.

*To all whom it may concern:*

Be it known that I, HENRY J. GOFF, a citizen of the United States, residing at Susanville, county of Lassen, State of California, have invented certain new and useful Improvements in Means for Making a Laminated Wood Product; and I do declare the following to be a full, clear, and exact description of same, reference being had to the accompanying drawings, and to the characters of reference marked thereon, which form a part of this application.

This invention relates to improvements in devices for making laminated or built-up wood products, and particularly to a device for enabling a unitary member to be obtained from the separate parts of the product after being assembled.

I have particularly in mind the production of door-stiles, the exterior surfaces of which are of first-grade and relatively expensive woods of any desired kind, and a filler or body of second or third grade wood of any kind, such as the scrap blocks obtainable in quantities at any box factory or the like.

One of the objects of my invention is to provide a device by means of which the parts of a product of this character, are caused to be united without any dovetailing or mortising together of the body or filler members with each other or with the side rails being had, and such as is employed in the construction of laminated stiles heretofore.

The reason of thus dovetailing the parts as above stated, is that so far no apparatus has been devised which will successfully, and in a commercially practicable manner, enable the parts to be assembled to form a solid and unitary product without such dovetailing and the like being resorted to.

On account of this operation, laminated door stiles as at present made, even with relatively cheap and wood-surfacings, are far more expensive than a one piece stile.

Another object of my invention is to provide a device whereby the various parts of the stile, when assembled, are firmly compressed and clamped together on all sides at one operation, so that the resulting product is as strong, if not stronger, than a one-piece stile, and is also practically proof against warping.

The clamping apparatus and its mode of operation are so simple, that the expense incident to its use is very low, and this fact combined with the elimination of the dovetailing of the filler blocks heretofore thought necessary, enables me to produce a laminated stile whose cost is not only far less than present stiles of this character, but also less than one-piece stiles.

These objects I accomplish by means of such structure and relative arrangement of parts as will fully appear by a perusal of the following specifications and claims.

In the drawings similar characters of reference indicate corresponding parts in the several views:

Fig. 1 is a perspective elevation of the clamping device, with a stile assembled therein ready for clamping, and partly broken out.

Fig. 2 is an enlarged cross section of the device, in clamping engagement with the stile.

Referring now more particularly to the characters of reference on the drawings, the stile itself comprises outer-edge rails 1 of grade A wood of the desired kind, of a suitable thickness and of the full length necessary for the completed stile. These rails form the outer edges of the stile. The outer side faces of the stile are formed of continuous pieces of veneer 2 of the same kind and grade of wood as the rails 1, and extend between the outer edges of the same, the rails fitting therebetween.

The filling or interior body of the stile is formed of longitudinally extending and transversely disposed rows of blocks 3 of any kind of wood, the blocks of each row being of the same width and height but being of any odd lengths available, the only requirement being that the ends of the blocks of one row shall be staggered with respect to the ends of the blocks of the adjacent row.

Before assembling the parts, they are first planed to the required dimensions which will form a completed product of substantially the correct dimensions.

In assembling, one of the veneer pieces 2 is laid flat, glue is applied to the upper surface, and the edge rails 1 are placed in the proper positions thereon. The filler blocks 3 are then placed between the rails in rows as above described, with glue of course between adjacent surfaces. The top veneer piece is then glued onto the parts below, and the entire structure is subjected to a compressing clamping pressure applied to all exterior surfaces (except the upper and lower ends) simultaneously.

After being thus clamped for two or three hours without being disturbed, to allow the glue to set, the product may be removed from the clamping means, and should be placed where it may remain 2 or 3 days without being disturbed, before using.

I preferably use waterproof glue, and have found that the product may be immersed in water for a considerable period without showing any tendency to warp, disintegrate or otherwise deteriorate.

The device I employ for applying the necessary pressure to the parts in a commercially practicable and inexpensive manner is constructed as follows: A rigid, flat and smooth surfaced base plate 4, of greater surface area than that of the stile with respect to the width and length of the latter, has a vertical flange or edge plate 5 projecting upwardly therefrom for its full length, of a somewhat lesser height than the thickness of the stile, and disposed somewhat close to one edge of the plate. The surface of said flange which faces the far edge of the base plate is perfectly straight and smooth, and makes a 90° angle with the base.

The base plate supports the under veneer piece of the stile, while the flange forms an abutment and gage for the adjacent edge rail of the stile.

Another flat plate 6, finished on its under face, is superimposed above the plate 4, and has an integral full-length flange 7 depending at right angles thereof in transversely spaced relation to the flange 5 a distance not less than the width of the stile. This flange 7 is also of lesser height than the thickness of the stile.

Projecting up from the base 4 outside the plane of the flanges 7 are lugs 8, arranged as pairs in suitably spaced relation lengthwise of the base. The inner faces of these lugs have on inward slant from top to bottom, the slanting faces projecting into the normal plane of location of the flange 7.

Between the each pair of lugs 8 is swivelly mounted a screw-eye 9 or the like, adapted when raised to fit in a slot 10 cut transversely in the upper plate 6 from the adjacent edge thereof, outwardly of the flange 7. A turnable clamping handle member 11 is mounted on the screw, being adapted to bear down on the upper surface of the plate 6 when the latter is lowered and the screw is in the slot as above stated.

For each pair of lugs 8, lug means 12 is provided on the base plate behind the flange 5, in which is swivelly mounted a screw-eye 13 or similar member which projects through a clearance hole 14 in the plate 6 and has convex-faced adjustment nuts 15 thereon above and below the plate.

By means of this arrangement, a flexible or double-swivel form of hinge for the plate 6 is provided, enabling the same to be swung up and away from the plate 4, and also allows for an alteration of the spacing of said plates relative to each other adjacent their connected edges.

In operation, the clamping screw members are first moved clear of the upper plate, as shown in Fig. 1, so that the upper plate may be swung clear of the base plate.

The stile is then assembled on the base in the manner previously described, and the plate 6 is lowered onto the same. Before said plate contacts with the upper face of the stile, the flange 7 engages the sloping faces of the lugs 8. The clamping screws 9 are then raised into the slots 10, and the handles 11 turned down. As soon as said handles bear down against the plate, the latter is moved both downwardly and laterally, owing to the engagement of the flange 7 with the lugs. The downward pressure of the plate causes the same to press against the adjacent portion of the stile, while the lateral movement causes the flange 7 to be moved toward the opposite flagne 5, pressing the rails of the stile together, and of course the intermediate blocks 3 also. It will be evident that the greater the vertical pressure of the upper plate, the greater will be the lateral pressure imparted to the flange 7.

With the lateral movement of the upper plate, the swivel hinge members 12, which are vertically disposed when the flange 7 first strikes the lugs 8, or even then have a slight backward tilt, are now caused to be tilted further backward or out of a straight line, causing the adjacent portion of the upper plate to be lowered into firm pressing engagement with the adjacent portion of the stile.

It will thus be seen that pressure is exerted on all sides of the stile, which pressure may be easily arranged to be substantially uniform by adjusting the nuts 15 on the hinge members at the outset of operations and to suit stiles of different thicknesses.

The horizontal spacing between the flanges 5 and 7 when the plates 4 and 6 are brought together is such as to firmly press the transverse parts of the stile together. If the stile is of a narrower size, a suitable spacer strip may be laid against the flange 5 before assembling the stile to bring the opposite edge of the latter out to the necessary plane.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A clamping device comprising separate and spaced plates, flanges mounted in opposed relation thereon and projecting toward the opposite plates, said plates and flanges being arranged to receive the product to be clamped therebetween, and means for moving the plates and flanges toward each other and into clamping engagement with the opposed faces of the product.

2. A clamping device comprising upper and lower plates, independent of each other, flanges mounted in opposed relation on the plates and projecting toward the opposite plates, a common clamping means, and means whereby when the clamping means is actuated the plates will be moved toward each other and the flanges will similarly be moved toward each other.

3. A clamping device comprising upper and lower plates, independent of each other, flanges mounted in opposed relation on the plates and projecting toward the opposite plates, a common clamping means applied to one plate adjacent one longitudinal edge thereof, and means whereby when the clamping means is actuated said one plate will be moved both laterally and toward the other plate, whereby to cause the flange thereon to be moved horizontally relative to the opposed flange.

4. A clamping device comprising opposed plates hinged together along one edge, a flange on one plate inwardly of the hinge and projecting toward the other plate, a flange on said other plate projecting toward the first plate and in transversely spaced relation to the flange thereon, means for forcing said plates toward each other, and means on the first plate engaged by the flange on the other plate for causing said flange to be moved toward the opposite flange when the plates are thus forced together.

5. A clamping device comprising opposed plates hinged together along one edge, means applicable to the plates adjacent the edges thereof opposite to the hinge for moving the adjacent portions of the plates toward each other, and means whereby at the same time the portions of the plates adjacent the hinge will also and automatically be moved toward each other.

6. A clamping device comprising opposed plates hinged together along one edge, a flange on one plate inwardly of the hinge and projecting toward the other plate, a flange on said other plate projecting toward the first plate and in transversely spaced relation to the flange thereon, means for forcing said plates toward each other, and lug means on the first plate opposite to the flange thereon, the inner faces of said lugs sloping inwardly from top to bottom, and being positioned to be engaged by the outer face of the flange on the other plate when the latter is moving toward the first plate.

7. A clamping device including opposed plates, means for hinging the same along one edge, such means comprising rigid members projecting substantially at right angles to the plates and extending therebetween, independent swivel connections between said members and both plates, and means for moving the plates together applied thereto along the edges thereof opposite to the hinge means.

8. A clamping device including opposed plates, means for hinging the same along one edge, such means comprising rigid members projecting substantially at right angles to the plates and extending therebetween, independent swivel connections between said members and both plates, means for moving the plates together applied thereto along the edges thereof opposite to the hinge means, and means for adjusting the operative length between said swivel connections at will.

In testimony whereof I affix my signature.

HENRY J. GOFF.